United States Patent [19]
Gelder et al.

[11] Patent Number: 5,452,489
[45] Date of Patent: Sep. 26, 1995

[54] DOCK LEVELER WITH AUTOMATIC END BARRIER

[75] Inventors: Kenneth Gelder, West Bend; Gerard M. Palmersheim, Hubertus, both of Wis.

[73] Assignee: Systems, Inc., Germantown, Wis.

[21] Appl. No.: 124,449

[22] Filed: Sep. 21, 1993

[51] Int. Cl.⁶ ..................................................... E01D 1/00
[52] U.S. Cl. .............................. 14/69.5; 14/71.1; 14/71.3; 14/71.7
[58] Field of Search ..................................... 14/69.5, 71.0, 14/71.1, 71.3, 71.7; 414/396, 401, 584

[56] References Cited

U.S. PATENT DOCUMENTS

| | | |
|---|---|---|
| 1,967,620 | 7/1934 | Kahn . |
| 2,689,965 | 9/1954 | Fenton . |
| 2,993,219 | 7/1961 | Pennington . |
| 3,268,932 | 8/1966 | Hartman . |
| 3,280,414 | 10/1966 | Layne . |
| 3,424,323 | 1/1969 | Barnaby . |
| 3,486,181 | 12/1969 | Hecker, Jr. et al. . |
| 3,786,530 | 1/1974 | Le Clear . |
| 3,872,948 | 3/1975 | Richards . |
| 4,127,856 | 11/1978 | Bickel . |
| 4,146,888 | 3/1979 | Grunewald et al. . |
| 4,155,468 | 5/1979 | Royce . |
| 4,191,503 | 3/1980 | Neff et al. . |
| 4,207,019 | 6/1980 | Cone . |
| 4,208,161 | 6/1980 | Hipp et al. . |
| 4,224,709 | 9/1980 | Alten . |
| 4,264,259 | 4/1981 | Hipp . |
| 4,267,748 | 5/1981 | Grunewald et al. . |
| 4,282,621 | 8/1981 | Anthony et al. . |
| 4,304,518 | 12/1981 | Carder et al. . |
| 4,364,137 | 12/1982 | Hahn . |
| 4,373,847 | 2/1983 | Hipp et al. . |
| 4,379,354 | 4/1983 | Hahn et al. . |
| 4,443,150 | 4/1984 | Hahn et al. . |
| 4,472,099 | 9/1984 | Hahn et al. . |
| 4,501,042 | 2/1985 | DiFonzo . |
| 4,551,877 | 11/1985 | Allen . |
| 4,553,895 | 11/1985 | Ellis . |
| 4,555,211 | 11/1985 | Metz . |
| 4,560,315 | 12/1985 | Hahn . |
| 4,589,813 | 5/1986 | Hagen et al. . |
| 4,630,989 | 12/1986 | Davey . |
| 4,634,334 | 1/1987 | Hahn et al. . |
| 4,674,941 | 6/1987 | Hagemann . |
| 4,692,755 | 9/1987 | Hahn . |
| 4,728,242 | 3/1988 | Eriandsson . |

(List continued on next page.)

FOREIGN PATENT DOCUMENTS

| | | |
|---|---|---|
| 935606 | 10/1973 | Canada . |
| 2296583 | 12/1975 | France . |
| 2634652 | 2/1968 | Germany . |
| 2852888 | 8/1980 | Germany . |

OTHER PUBLICATIONS

Rite–Hite "HD–3000 Safe–T–Lip Leveler" brochure

*Primary Examiner*—Ramon S. Britts
*Assistant Examiner*—Pamela A. O'Connor
*Attorney, Agent, or Firm*—Reinhart, Boerner, Van Dueren, Norris & Rieselbach

[57] ABSTRACT

A dock leveler is mounted in a pit formed in the floor of the loading dock area of a factory, warehouse or similar facility. The loading dock includes an overhead door adjacent the dock leveler. The dock leveler is retractable so that, when it is not in use, it can be stored fully within the facility inboard of the overhead door. To prevent vehicles from inadvertently falling off the end of the stored dock leveler, the dock leveler includes a raisable barrier. When raised, the barrier is located between the end of the dock leveler and the overhead door. In addition to preventing vehicles from accidentally running off the end of the dock leveler, the barrier also protects the overhead door from accidental collisions with such vehicles. When the dock leveler is in use, the barrier folds away to a position below the extendible ramp. Alternatively, the dock leveler can be non-retractable and the barrier can be raised and lowered in from of the ramp.

13 Claims, 4 Drawing Sheets

U.S. PATENT DOCUMENTS

| | | |
|---|---|---|
| 4,735,542 | 4/1988 | Fisher et al. . |
| 4,767,245 | 8/1988 | Kovach et al. . |
| 4,815,918 | 3/1989 | Bennett et al. . |
| 4,830,563 | 5/1989 | Yeakle . |
| 4,843,373 | 6/1989 | Trickle et al. . |
| 4,848,732 | 7/1989 | Rossato . |
| 4,861,217 | 8/1989 | Eriandsson . |
| 4,865,507 | 9/1989 | Trickle . |
| 4,920,598 | 5/1990 | Hahn . |
| 4,938,647 | 7/1990 | Eriandsson . |
| 4,969,792 | 11/1990 | Ellis et al. . |
| 4,973,213 | 11/1990 | Eriandsson . |
| 5,040,258 | 8/1991 | Hahn et al. . |
| 5,047,748 | 9/1991 | Trickle . |
| 5,096,359 | 3/1992 | Alexander . |
| 5,120,181 | 6/1992 | Alexander . |

DOCK LEVELER WITH AUTOMATIC END BARRIER

BACKGROUND OF THE INVENTION

This invention relates generally to dock levelers and, more particularly, to dock levelers having end barrier structures.

Dock levelers are typically installed in the loading dock areas of factories, warehouses and similar facilities. In use, a dock leveler serves primarily as a ramp or bridge that extends from the loading dock area of the factory or warehouse into the rear end of a mack trailer. Truck trailers, however, are not of perfectly uniform height above ground. Furthermore, the actual height of a mack trailer above ground varies as the trailer is loaded and unloaded. Accordingly, dock levelers are arranged to pivot both upwardly and downwardly relative to the loading dock floor in order to accommodate trailers of different heights.

When not in use, dock levelers are typically positioned level with the floor of the loading dock area. This helps avoid the creation of trip hazards and permits fork trucks and other vehicles to be driven across the loading dock floor. Nevertheless, a potential hazard still exists in that vehicles can inadvertently drive off the ends of the dock levelers into the adjacent drive approach. To avoid this hazard, a variety of mechanisms have been proposed.

In one mechanism, a pivoting plate was affixed to the end of the dock leveler. When the dock leveler was in use, the plate was pivoted to a substantially horizontal position substantially coplanar with the top surface of the dock. When the dock leveler was not in use, the plate was pivoted to a substantially vertical position to form a barrier to keep vehicles from falling off the end of the dock leveler. Although effective, the system created a pinch hazard as the plate pivoted between the vertical and horizontal positions.

In another system, such as that shown in U.S. Pat. No. 4,920,598, a lip, hingedly connected to the front edge of the dock leveler, was arranged to slide vertically between a first position wherein a portion of the lip protruded above the ramp and a second position wherein no portion of the lip extended above the ramp. In the first position, the protruding portion of the lip formed a barrier to keep vehicles from running off the end of the dock leveler.

In still another system, such as that shown in U.S. Pat. No. 5,040,258, a dock leveler included a lip that was operatively connected to the front edge portion of the dock leveler ramp for movement between a depending position and an outwardly extended cantilevered position. A barrier assembly connected to the lip was arranged to project above the ramp surface when the lip was in the depending position to form a barrier when the lip was not extended.

Although each of these systems was effective in keeping vehicles from running off the end of the ramp, none of these systems was effective in preventing vehicle damage to the overhead doors of the loading dock, which can occur, for example, when the overhead doors of a loading dock are closed and a fork truck or other vehicle moving on the upper ramp surface of an idle dock leveler collides with the closed door. Although the closed door keeps the vehicle from running off the end of the dock leveler, the door itself frequently suffers considerable damage in the resulting collision. Although such door damage is preferable to the potentially far more serious damage and injury that can result if the vehicle were to drive off the end of the dock leveler, door repair can, in time, become a significant expense.

SUMMARY OF THE INVENTION

The invention provides a dock leveler comprising an extendible ramp having an extended position and a retracted position. The dock leveler further includes a movable barrier having a raised position and a lowered position. The dock leveler further includes actuating structure operatively associated with the extendible ramp and the movable barrier for placing the movable barrier in the raised position only when the extendible ramp is in the retracted position.

The invention also provides a loading dock comprising a floor having a pit formed therein, a vertical wall extending upwardly from the floor and having an opening therein adjacent the pit, and a door adjacent the wall for opening and closing the opening. The dock leveler further includes an extendible ramp mounted in the pit having a forward end that projects through the opening in the wall when the ramp is extended and that does not project through the opening when the ramp is not extended. A barrier is mounted within the pit for movement between a lowered position wherein the barrier lies fully below the level of the dock floor, and a raised position wherein a portion of the barrier projects above the level of the dock floor. The barrier is positioned so that when the ramp is not extended and the door is closed, the projecting portion of the barrier projects above the floor between the forward end of the ramp and the door. The dock leveler further includes structure operatively associated with the extendible ramp and the barrier for keeping the barrier in the lowered position whenever the ramp is other than in the retracted position.

The invention also provides a dock leveler comprising a ramp having an upper surface and an extendible forward section, a barrier located under the ramp mounted for movement between a lowered position wherein no portion of the barrier projects above the level of the upper surface, and a raised position wherein an upwardly extending portion of the barrier projects above the level of the upper surface and actuating structure operatively associated with the ramp and the barrier for maintaining the barrier in the lowered position when the forward section of the ramp is extended and for permitting the barrier to be in the raised position only when the forward section of the ramp is not extended. The barrier is located so that the upwardly extending portion of the barrier is positioned immediately adjacent and forward of the extendible forward section when the barrier is in the raised position and the forward section of the ramp is not extended.

The invention also provides a dock leveler comprising a frame, a rear ramp section having a rear end pivotally coupled to the frame and having a forward end opposite the rear end, a forward ramp section telescopingly received in the forward end of the rear ramp section for movement between a retracted position and an extended position, and a hydraulic cylinder operatively coupled to the forward ramp section for moving the forward ramp section between the extended and retracted positions.

The invention also provides a loading dock comprising a floor having a pit formed therein, a vertical wall extending upwardly from the floor and having an opening therein adjacent the pit, a door adjacent the wall for opening and closing the opening in the wall and a ramp mounted in the pit having a forward end that projects through the opening in the wall. The ramp is pivotably raisable above the floor and a barrier is mounted within the pit for pivoting movement between a lowered position, wherein the barrier lies fully below the level of the floor, and a raised position, wherein a portion of the barrier projects above the level of the floor forwardly of the forward end of the ramp.

It is an object of the present invention to provide a new and improved dock leveler and loading dock.

It is another object of the present invention to provide a dock leveler that includes a barrier for preventing the inadvertent runoff of fork trucks or similar vehicles.

It is a further object of the present invention to provide an improved dock leveler that protects against accidental damage to the overhead doors of a loading dock when the dock leveler is in a storage position and the overhead doors of the loading dock are closed.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
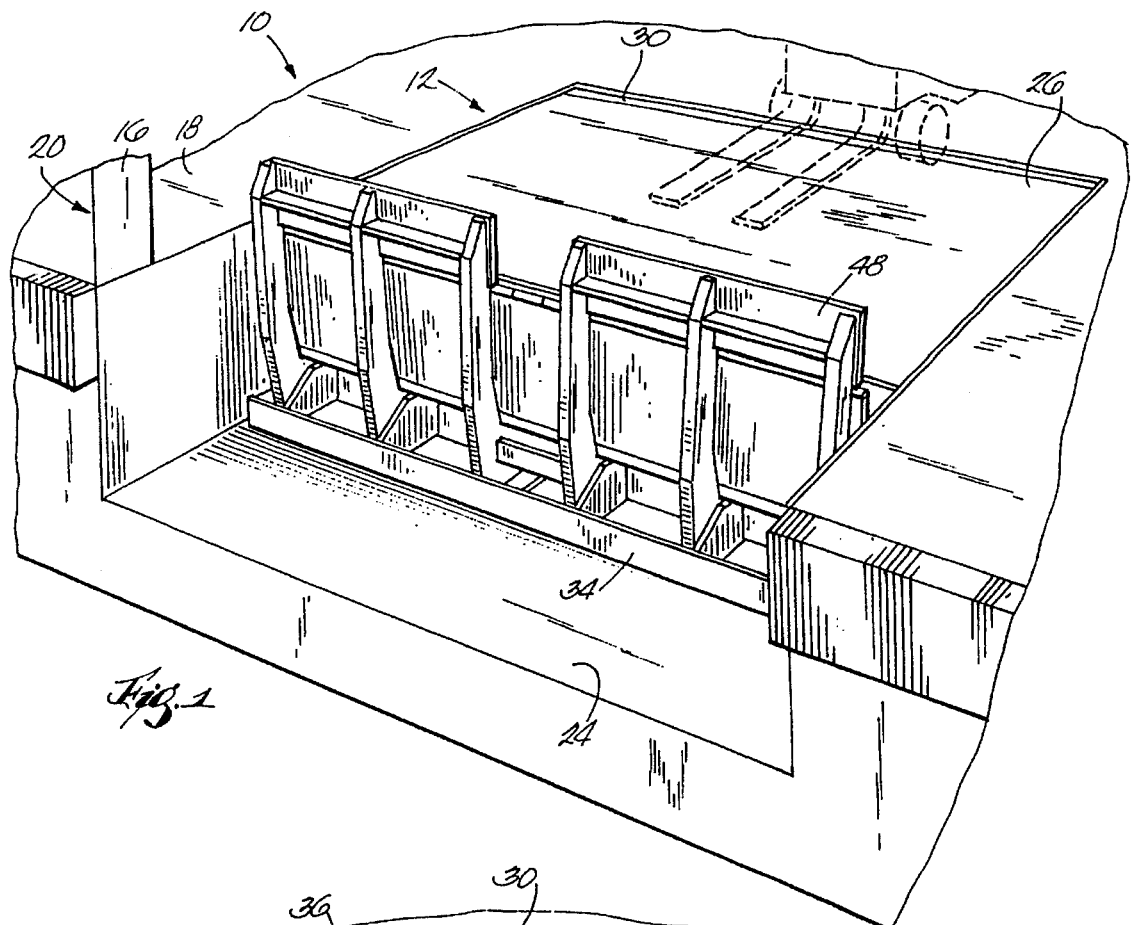
FIG. 1 is a perspective view of a loading dock having a dock leveler embodying various features of the invention, showing the dock level in a retracted or storage position.
Figure 2:
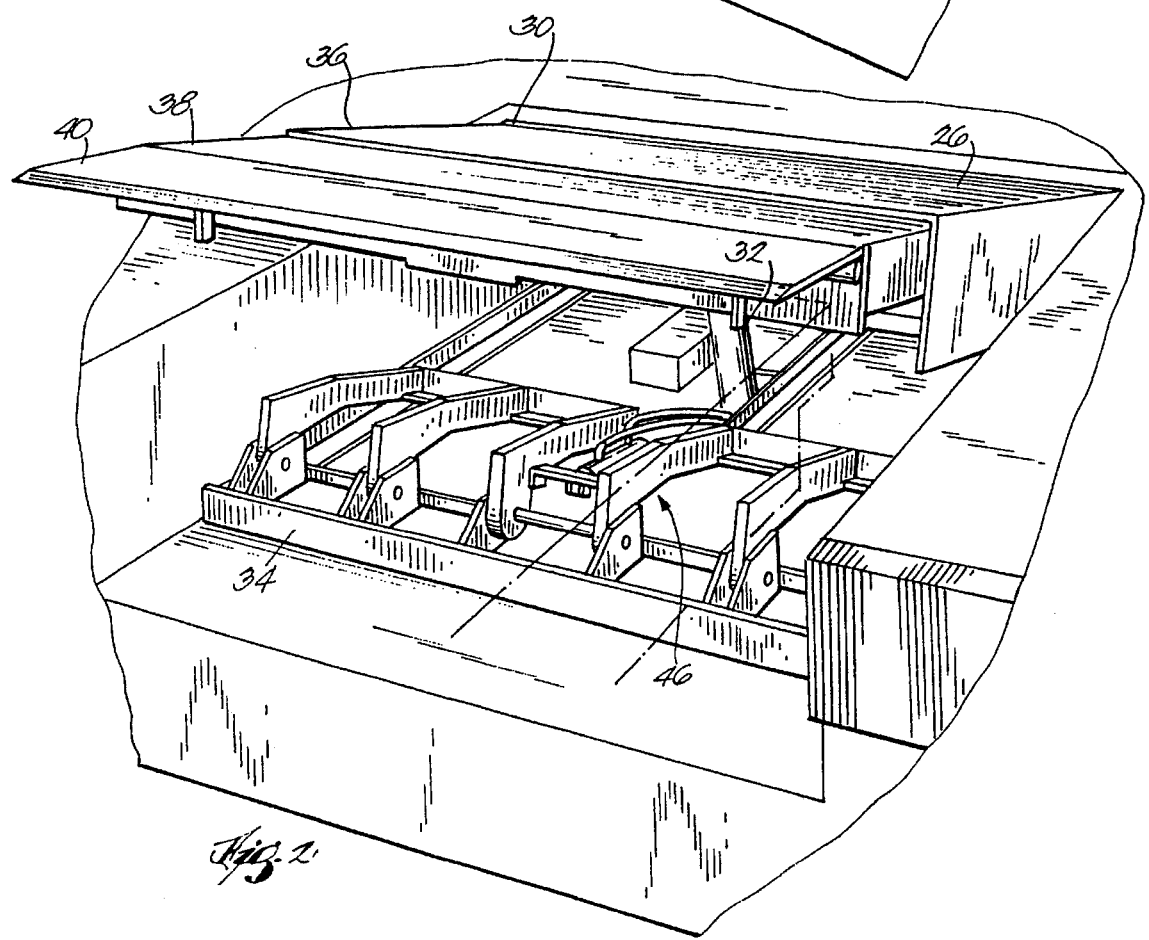
FIG. 2 is a perspective view similar to FIG. 1 showing the dock leveler in an extended position.
Figure 3:
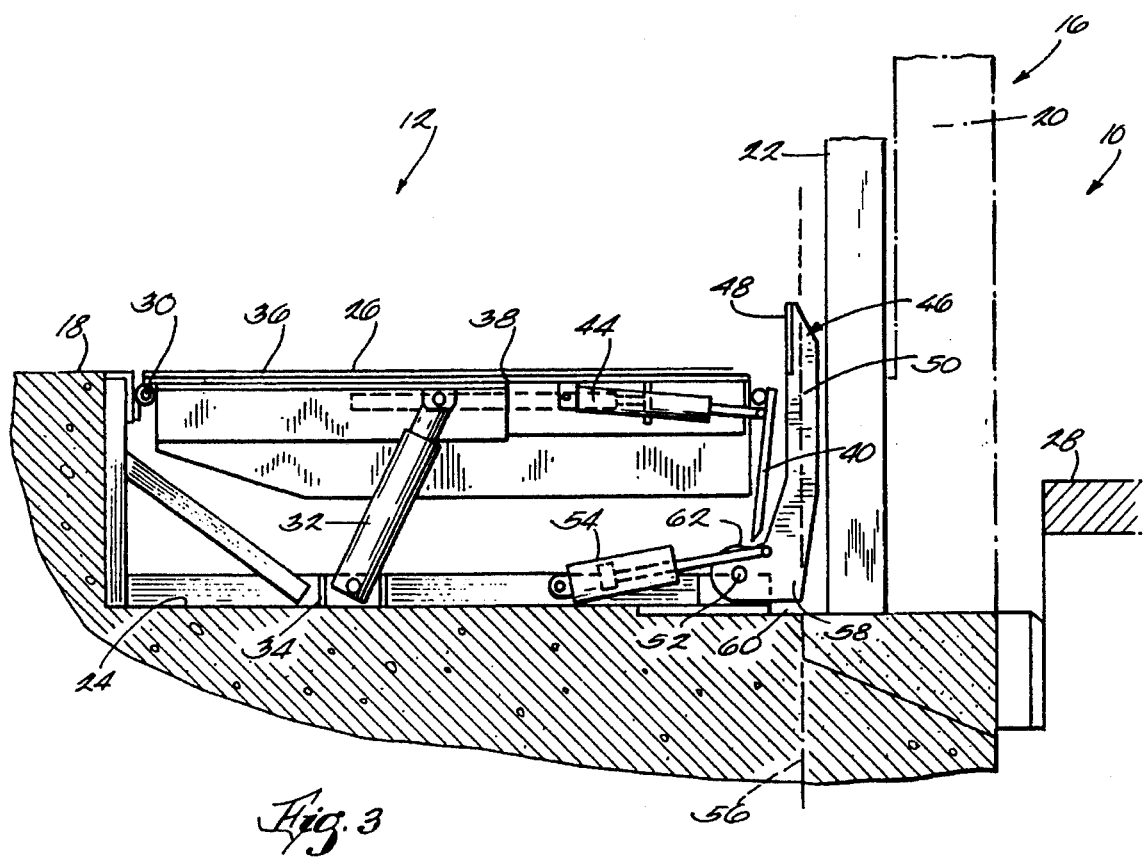
FIG. 3 is a side elevation view of the loading dock shown in FIGS. 1 and 2.

Referring to the drawings, and, in particular to FIGS. 1–3, a loading dock 10 including a dock leveler 12 embodying various features of the invention is illustrated. The loading dock 10, in accordance with conventional practice, is located adjacent the vertical exterior wall 16 of a factory, warehouse or similar facility. The facility includes a dock floor 18, and the wall 16 extends upwardly from the dock floor 18. The wall 16 includes an opening 20 through which freight or other goods can be loaded and unloaded. An overhead door 22 adjacent the inner side of the wall 16 allows the opening 20 to be opened or closed as desired. The dock leveler 12 itself is located in a pit 24 formed in the dock floor 18.

The dock leveler 12 generally includes a movable ramp 26 that serves as a bridge between the dock floor 18 and the bed 28 of a truck backed up against the loading dock 10. Because truck beds are not all of uniform height above ground, the ramp 26 can be pivoted up or down relative to the dock floor 18. To this end, the dock leveler 12 includes a horizontal pivot 30 along the rear edge of the ramp 26. A hydraulic hoist cylinder 32 connected at one end to the underside of the ramp 26 functions to move the ramp 26 around the pivot 30 to raise or lower the ramp 26 relative to the dock floor 18. In the illustrated embodiment, the dock leveler 12 includes a framework 34 that is received in the pit 24 in the dock floor 18. The opposite end of the hydraulic hoist cylinder 32 is coupled to the frame 34 as is the pivot 30 at the rear of the ramp 26.

In the illustrated embodiment, the ramp 26 is configured so that it can be retracted to remain fully within the facility when the loading dock 10 is idle and the overhead door 22 is closed. To this end, the ramp 26 is extendible and includes a rear ramp section 36 and a forward ramp section 38 telescopingly received in the forward end of the rear ramp section 36. An extendible lip 40 is pivotally attached at the forward end of the forward ramp section 38. One or more hydraulically actuated extension cylinders 42 (FIGS. 5 and 6) having one end coupled to the rear ramp section 36 and another end coupled to the forward ramp section 38 move the ramp 26 between a retracted position, wherein the forward ramp section 38 is retracted relative to the rear ramp section 36, and an extended position wherein the forward ramp section 38 is extended relative to the rear ramp section. The lengths of the rear ramp section 36 and the forward ramp section 38 are selected so that when the extendible ramp 26 is retracted it is inboard of the overhead door 22, and when the extendible ramp 26 is extended, it extends sufficiently far beyond the building wall 16 to reach the bed 28 of the truck. In the illustrated embodiment, another hydraulic cylinder 44 extends and lowers a lip 40. One suitable ramp is shown and described in the copending application of Gelder, et al., Serial No. 08/124,715, filed concurrently herewith, and incorporated by reference herein.

In accordance with one aspect of the invention, the dock leveler 12 is configured to prevent vehicles from inadvertently falling off the forward end of the ramp 26 when the dock leveler 12 is idle. To this end, the dock leveler 12 includes a barrier 46 that is mounted for movement between a lowered position wherein no portion of the barrier 46 projects above the level of the upper surface of the ramp 26, and a raised position wherein an upwardly extending portion of the barrier 46 does project above the level of the upper surface of the ramp 26. In the illustrated embodiment, the barrier 46 comprises a horizontal plate 48 that is welded or otherwise joined to one end of one or more elongate barrier arms 50. The opposite ends of the arms are mounted for pivoting movement around a pivot axis 52 located below the ramp 26 approximately under the forward end of the forward ramp section 38 when the ramp 26 is fully retracted. The length of the arms 50 is such that, when the barrier 46 is moved to the raised position, the ends of the arms 50 and the plate 48 affixed thereto project above the upper surface of the ramp 26 when the ramp 26 is in the retracted, horizontal, idle or storage position. In the illustrated embodiment, the barrier 46 projects approximately seven inches above the ramp surface to form a barrier having sufficient height to prevent vehicles from inadvertently falling off the end of the ramp 26. It will be appreciated that other barrier heights can be selected and that the example shown is meant to be illustrative rather than limiting.

The barrier 46 is moved between the lowered and raised positions by means of a hydraulic barrier cylinder 54 having one end coupled to the arms 50 and another end coupled to the frame 34 of the dock leveler 12. When the barrier cylinder 54 extends, the barrier 46 is raised. When the barrier cylinder 54 retracts, the barrier 46 is lowered.

As further illustrated in FIGS. 1–3, each barrier arm 50 includes, adjacent its lower end, an offset or dogleg that effectively offsets the pivot axis 52 of the barrier from the longitundinal axis 56 of each arm 50. In addition, a substantially squared-off corner 58 is formed at the lowermost end of each arm. The corner 58, in turn, rests against a substantially horizontal metallic plate 60 positioned under the arms 50 on the floor of the pit 24. The corners 58 thus formed serve to support the barrier arms 50 and provide considerable rigidity and strength in the event a moving vehicle such a forklift collides with the barrier 46. In such an event, the brunt of the force is taken up by the contact between the corners 58 and the metallic plate 60 rather than by the barrier cylinder 54. The barrier arms 50 further include additional flat segments that form a shelf 62 upon which the outer end of the lip 40 rests when the dock leveler 12 is in the storage position. This further contributes to the rigidity and stability of both the ramp 26 and the barrier 40.

When the dock leveler 12 is in use, the barrier 46 is rotated to the lowered position. In the lowered position, the barrier 46 remains substantially fully below the extendible ramp 26 and the extendible ramp 26 is free to extend and pivot upwardly or downwardly as needed to reach the bed 28 of the truck. In the illustrated embodiment, the barrier 46 is moved to the lowered position through retraction of the barrier cylinder 54.

The sequential operations required to move the dock leveler 12 from the storage or idle position to the use position are shown in FIGS. 5a–5d.

Figure 5A:
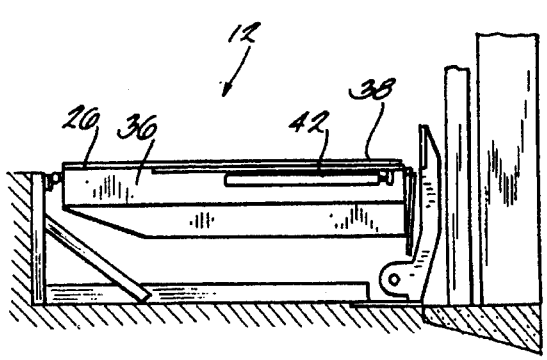
FIGS. 5a–5d are diagrammatic views of the dock leveler illustrated in FIG. 1 showing the dock leveler transitioning from the retracted or storage position to the extended or use position.

In FIG. 5a, the extendible ramp 26 is retracted and is level with the dock floor 18. The barrier 46 is raised and is positioned between the forward end of the ramp 26 and the closed overhead door 22. The lip 40 is lowered and rests on the shelf 62 formed by the barrier arms 50.

Figure 5B:
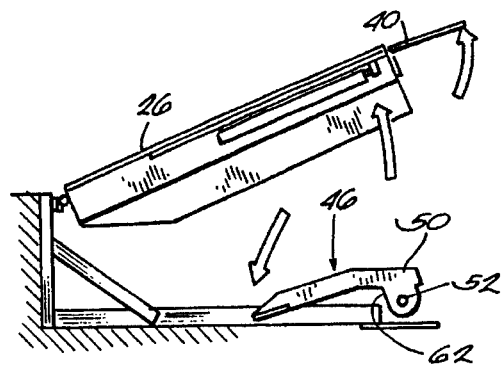

In FIG. 5b, the overhead door 22 has been raised allowing the lip 40 to be extended. The ramp 26 has also been raised sufficiently to allow the barrier 46 to be rotated downwardly from the raised position to the lowered position. The ramp is held up hydraulically.

Figure 5C:
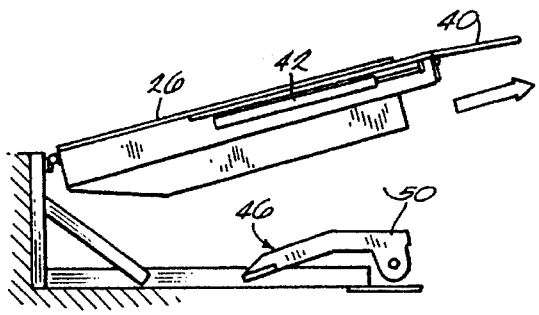

In FIG. 5c, the barrier 46 has been completely lowered, the lip 40 has been extended and the forward ramp section 38 is being extended relative to the rear ramp section 36 to increase the overall effective length of the ramp 26.

Figure 5D:
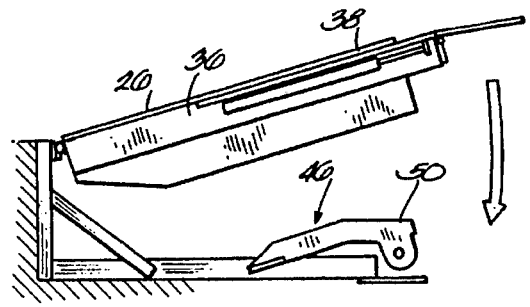

In FIG. 5d, the ramp 26 has been fully extended and the ramp 26 is pivoted downwardly until the lip 40 reaches and contacts the bed 28 of the truck. In addition, the hydraulic lift applied to the ramp is released to allow the ramp to float with changes in the truck height as the truck is loaded and unloaded.

Figure 6A:
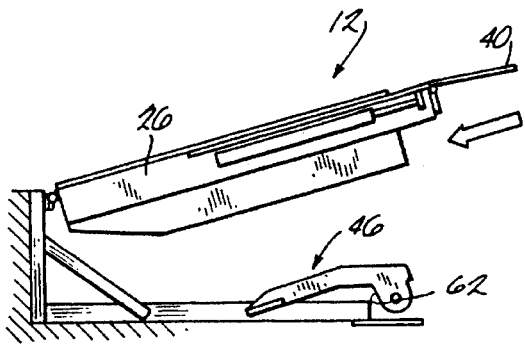
FIGS. 6a–6b are diagrammatic views, similar to FIGS. 5a–5d, showing the dock leveler transitioning from the extended or use position to the retracted or storage position.
Figure 6B:
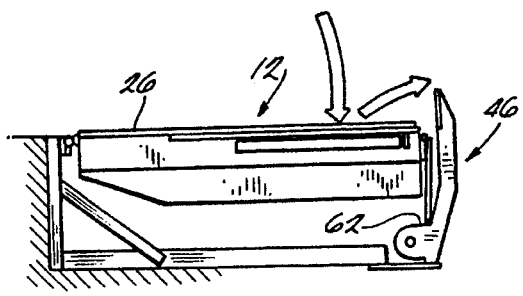

The sequence for placing the dock leveler 12 back into the idle position is shown in FIGS. 6a and 6b. Initially, the ramp 26 is pivoted to the fully raised position whereupon the forward ramp section 38 is retracted and the lip 40 is lowered. Thereafter, the ramp 26 is maintained in the raised position while the barrier 46 is raised. After the barrier 46 is fully raised, the ramp 26 is pivoted downwardly to the horizontal idle position with the outermost edge of the lip 40 contacting the shelf 62 formed by the arms of the barrier.

Figure 4:
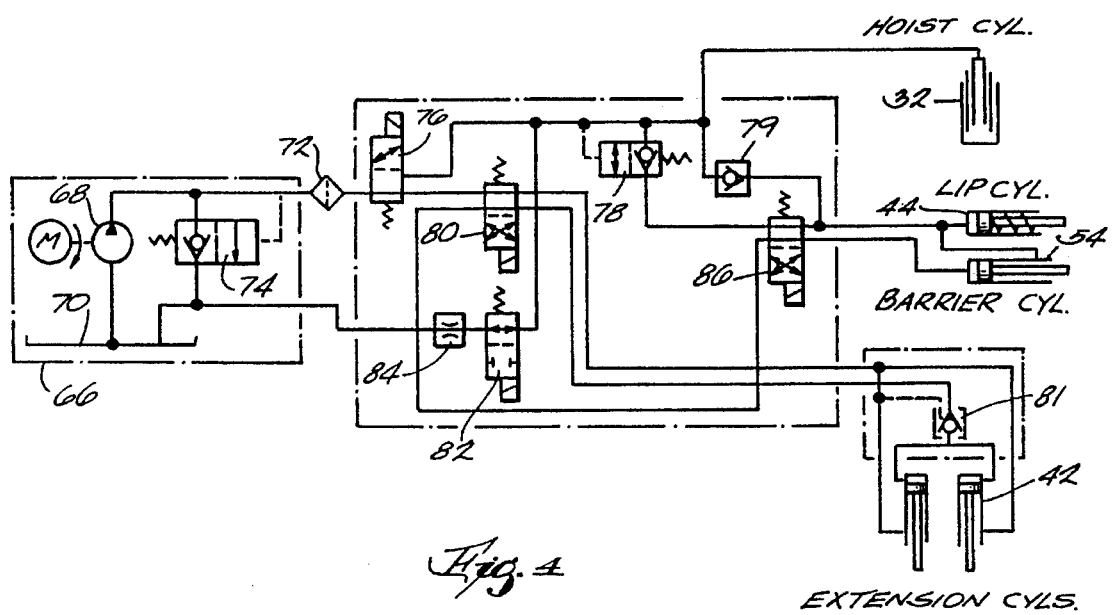
FIG. 4 is a schematic diagram of a hydraulic system incorporated in one embodiment of the dock leveler shown in FIGS. 1–3.

A hydraulic circuit 64 suitable for use with the dock leveler 12 herein described is shown in the schematic diagram of FIG. 4. Pressurized hydraulic fluid is provided by a hydraulic power pack 66 that includes a motor driven pump 68. The motor driven pump 68 draws hydraulic fluid from a reservoir 70 and pumps it through a filter 72 to the various hydraulic cylinders. Protection against overpressure conditions is provided by means of a pilot actuated pressure relief valve 74.

When the dock leveler 12 is to be actuated from the storage or idle position, pressurized hydraulic fluid is initially provided to the hoist cylinder 32 through a solenoid controlled directional control valve 76. After the hoist cylinder 32 is fully extended, hydraulic pressure in the hydraulic line to the hoist cylinder 32 rises until it is sufficiently high to open a pilot actuated relief valve 78. When open, the pilot actuated relief valve 78 diverts the hydraulic fluid to the lip cylinder 44 and the barrier cylinder 54. This causes the lip cylinder 44 to extend thereby extending the lip 40. It will be appreciated that the lip 40 extends only after the ramp 26 is raised. At the same time, the barrier cylinder 54 is retracted causing the barrier 46 to rotate to the lowered position. A check valve 79 isolates the lip cylinder 44 from the hoist cylinder 32 to keep the lip 40 extended as the ramp 26 is lowered.

After the ramp 26 is raised, and after the lip 40 is extended and the barrier 46 lowered, a normally open solenoid controlled two way valve 82 closes, thereby locking the hoist cylinder 32, the lip cylinder 44 and the barrier cylinder 54 in their then current positions. Next, a solenoid controlled crossover valve 80 is actuated causing hydraulic fluid from the hydraulic power pack 66 to be applied through a pilot actuated check valve 81 to the extension cylinders 42. The extension cylinders 42, in turn, extend the forward ramp section 38 of the ramp 26. After the forward ramp section 38 is extended, hydraulic fluid from the hoist cylinder 32 and the lip cylinder 44 is allowed to bleed back to the reservoir through a solenoid controlled directional control valve 82 and a variable flow restrictor 84. This causes the extended ramp 26 to lower slowly down to the level of an adjacent track bed 28. In addition, the fluid flow from the hoist cylinder 32 through the control valve 82 and flow restrictor 84 allows the position of the ramp to change or float with changes in the height of the truck as the truck is loaded and unloaded. The dock leveler 12 remains in this condition until the leveler 12 is to be placed in the storage condition once again.

The check valve 81 presents unintended fluid flow from the extension cylinders 42 and helps ensure that cylinders remain extended even if pressure drops in the supply line to the extension side of the cylinders. This, in turn, ensures that the ramp 26 remains extended even under the retractive force generated by the drive wheels of a fork vehicle as the vehicle drives over the ramp. Such unintended retraction of the ramp could have adverse safety consequences. When it is desired to retract the ramp 26, hydraulic pressure on the retraction side of the extension cylinders 42 applies a pilot signal to the check valve 81 to open the valve and permit fluid flow from the cylinders.

To return the dock leveler 12 to the storage position, the solenoid controlled directional control valve 76 is once again actuated to raise the ramp 26 and extend the lip 40. Thereafter, the solenoid controlled cross over valve 80 is opened causing the extension cylinders 42 to retract the extended forward ramp section 38. Another solenoid controlled cross over valve 86 is actuated causing the barrier cylinder 54 to extend and thereby raise the barrier 46. The solenoid controlled directional control valve 76 is closed once again and the solenoid controlled directional control valve 82 is opened permitting the hoist cylinder 32 to bleed slowly through the variable flow restrictor 84 thereby lowering the ramp 26.

Actuation of the various solenoid controlled valves can be provided through a suitable operator control panel to provide manual control of the dock leveler 12. Alternatively, appropriately located limit switches can be included to control the sequential actuation of the solenoid controlled valves. Or, a suitably programmed microprocesser-based control system can be included to provide fully automatic electronic control of the dock leveler 12.

One important advantage of the dock leveler herein described is that, in the retracted storage or idle position, the dock leveler 12 is contained fully within the facility. No portion of the dock leveler 12 projects beyond the overhead door 22, and by closing the overhead door 22, the dock leveler 12 is fully protected from the elements. Furthermore, the raised barrier 46 is positioned inwardly of the overhead door 22 between the door 22 and the end of the ramp 26. When so positioned, the barrier 46, in addition to its primary role of preventing people and vehicles from falling off the end of the dock leveler 12, protects the overhead door 22 from collisions with carelessly driven vehicles within the facility. In other words, if a fork truck or other vehicle within the facility is driven toward the closed overhead door 22, it will hit the barrier 46 before it hits the overhead door 22.

Figure 7A:
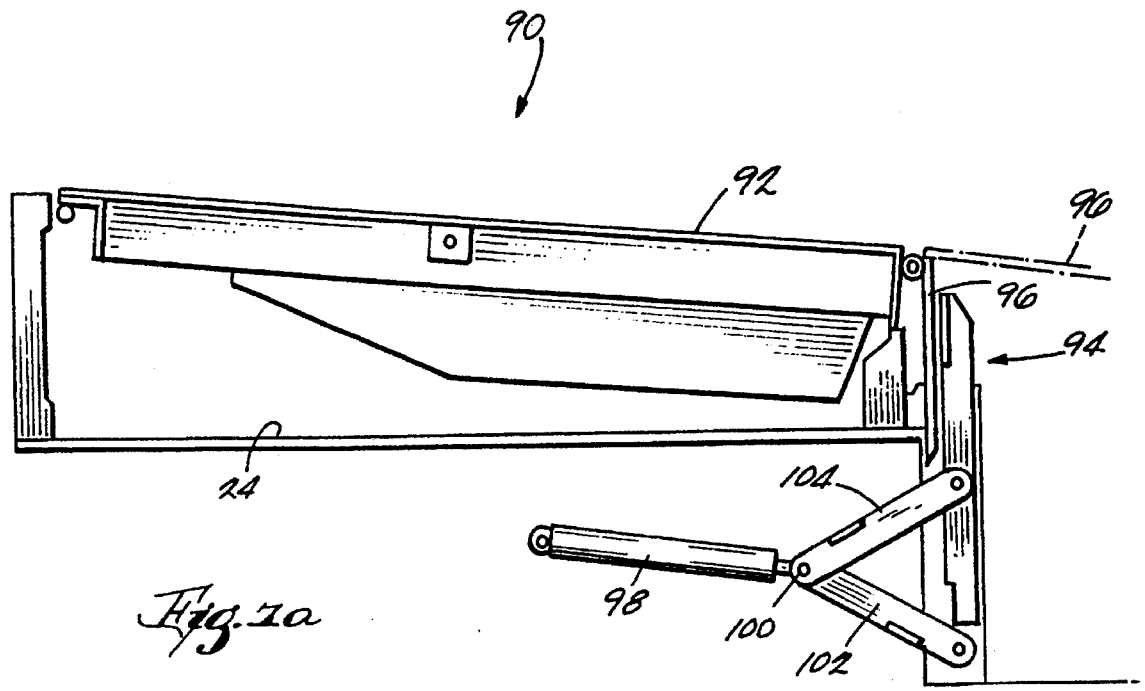
FIGS. 7a and 7b are side elevation views of an alternate embodiment dock leveler showing an alternate form of barrier in (a) a lowered position and (b) a raised position.
Figure 7B:
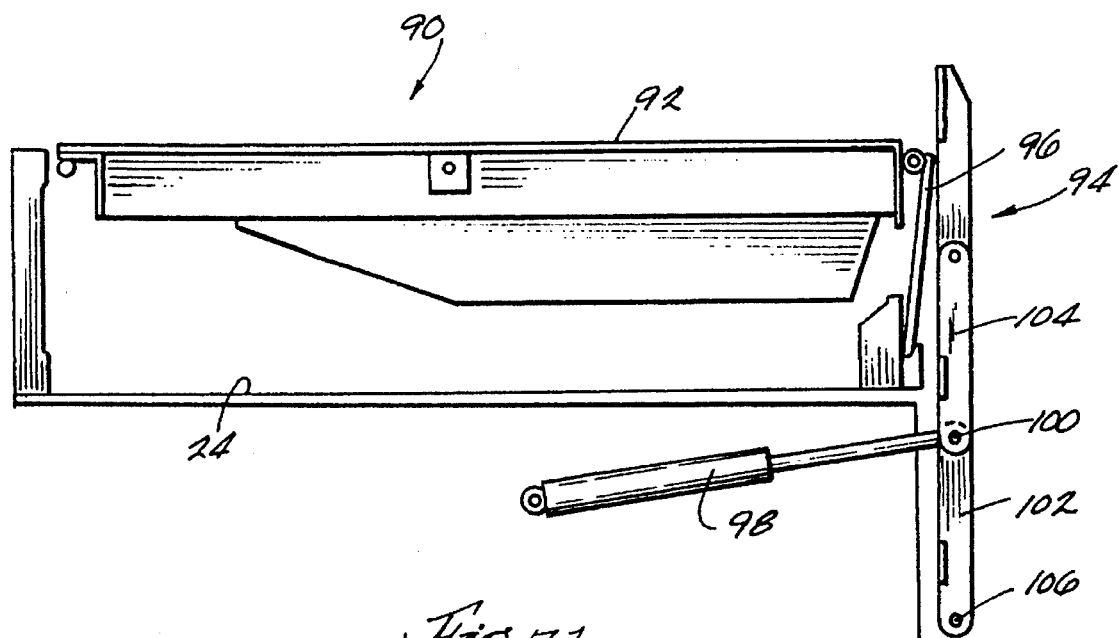

An alternate embodiment of a dock leveler 90 incorporating various features of the invention is shown in FIGS. 7a and 7b. In this embodiment, which is particularly useful in connection with dock levelers wherein the ramp 92 is not extendible, a barrier 94 is mounted for vertical movement immediately forward of the ramp 92. The barrier 94 is positioned so that when the lip 96 of the ramp 92 is extended, the lip 96 projects beyond the barrier 94 as shown in FIG. 7a. When the lip 96 is lowered, it is positioned between the barrier 94 and the forward end of the ramp 92.

The barrier 94 is raised and lowered by means of a hydraulic cylinder 98 having one end 100 coupled to the pivoting juncture between two scissors-like elongate links 102, 104. The opposite ends of the links are pivotally connected, respectively, to the relatively moveable barrier 94 and to a relatively immovable anchor point 106. When the cylinder 98 is extended, the links 102, 104 are pivoted away from each other to raise the barrier 94 to the position shown in FIG. 7b. When the cylinder 98 retracts, the links 102, 104 rotate toward each other to lower the barrier 94 to the position shown in FIG. 7a. One advantage of this arrangement is that it can be used even in the event the clearance between the underside of the ramp 92 and the floor of the pit 24 is limited.

It will be appreciated that various modifications can be made in the dock leveler 12. For example, the barrier need not be attached to the frame of the dock leveler but, alternatively, can be mounted directly onto the floor or sidewalls of the pit. Similarly, the lower end of the barrier cylinder can be coupled to the floor rather than to the frame of the dock leveler. Furthermore, the precise shape of the various components described in connection with the dock leveler are not critical. Also, the barrier can be used in conjunction with dock levelers that are not extendible, it being appreciated that protection for the overhead door would no longer be provided by the barrier as the barrier would then be positioned outboard of the door. Finally, although a particular hydraulic circuit has been described for purposes of illustration, it will be appreciated that various other hydraulic circuit configurations can be employed.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A dock leveler comprising:

an extendible ramp having an extended position and a retracted position;

a movable barrier having a raised position and a lowered position; and actuating means operatively associated with said extendible ramp and said movable barrier for placing said movable barrier in said raised position only when said extendible ramp is in said retracted position, so that, wherein said movable barrier is forward of said extendible ramp when said extendible ramp is in said retracted position and said movable barrier is in said raised position.

2. A dock leveler as defined in claim 1 wherein said movable barrier is below said extendible ramp when said movable barrier is in said lowered position.

3. A dock leveler as defined in claim 1 wherein said actuating means comprises a hydraulic cylinder.

4. A loading dock comprising:

a floor having a pit formed therein;

a vertical wall extending upwardly from said floor and having an opening therein adjacent said pit;

a door adjacent said wall for opening and closing said opening in said wall;

an extendible ramp mounted in said pit having a forward end that projects through said opening in said wall when said ramp is extended and that does not project through said opening when said ramp is not extended;

a barrier mounted within said pit for movement between a lowered position, wherein said barrier lies fully below the level of said floor, and a raised position, wherein a portion of said barrier projects above the level of said floor, said barrier being positioned for movement around a pivot axis located substantially under the forward end of said extensible ramp when said extendible ramp is not extended, so that when said ramp is not extended and said door is closed said projecting portion of said barrier projects above said floor between said forward end of said barrier and said door; and actuating means operatively associated with said extendible ramp and said barrier for keeping said barrier in said lowered position whenever said ramp is other than in said retracted position.

5. A loading dock as defined in claim 4 wherein said extendible ramp includes a rear ramp section and a forward ramp section telescopingly received in said rear ramp section.

6. A loading dock as defined in claim 5 wherein said forward ramp section is extended relative to said rear ramp section by means of a hydraulic cylinder.

7. A loading dock as defined in claim 4 wherein said actuating means comprises a hydraulic cylinder.

8. A dock leveler comprising:

a ramp having an upper surface and an extendible forward section;

a barrier located under said ramp and mounted for movement between a lowered position wherein no portion of said barrier projects above the level of said upper surface and a raised position wherein an upwardly extending portion of said barrier projects above the level of said upper surface; and actuating means operatively associated with said ramp and said barrier for maintaining said barrier in said lowered position when said forward section of said ramp is extended and for permitting said barrier to be in said raised position only when said forward section of said ramp is not extended;

said barrier being located so that said upwardly extending portion of said barrier is positioned immediately adjacent and forward of said extendible forward section when said barrier is in said raised position and said forward section of said ramp is not extended.

9. A dock leveler as defined in claim 8 wherein said actuating means includes a hydraulic cylinder coupled to said barrier.

10. A dock leveler as defined in claim 8 wherein said barrier is mounted for pivoting movement between said lowered and raised positions around a pivot axis located substantially under the forward end of said forward section when said ramp is not extended.

11. A dock leveler as defined in claim 8 wherein said barrier extends substantially across the full width of said ramp when said barrier is in said raised position.

12. A loading dock comprising:

a floor having a pit formed therein;

a vertical wall extending upwardly from said floor and having an opening therein adjacent said pit;

a door adjacent said wall for opening and closing said opening in said wall;

a ramp mounted in said pit having a forward end that projects through said opening in said wall, said ramp being pivotably raisable above said floor;

a barrier mounted within said pit for pivoting movement between a lowered position, wherein said barrier lies fully below the level of said floor, and a raised position, wherein a portion of said barrier projects above the level of said floor, forwardly of said forward end of said ramp.

13. A loading dock as defined in claim 12 wherein said barrier pivots between said lowered position and said raised position around a pivot axis located substantially under the forward end of said ramp.

* * * * *